(12) United States Patent
Hong

(10) Patent No.: US 8,434,691 B2
(45) Date of Patent: May 7, 2013

(54) THERMOSTATIC VALVE CONTROL STRUCTURE

(75) Inventor: Minnan Hong, Changhua County (TW)

(73) Assignee: Deluxe Brassware Co., Ltd., Hemei Township, Changhua County (TW)

( * ) Notice: Subject to any disclaimer, the term of this patent is extended or adjusted under 35 U.S.C. 154(b) by 763 days.

(21) Appl. No.: 12/640,542

(22) Filed: Dec. 17, 2009

(65) Prior Publication Data

US 2011/0146812 A1 Jun. 23, 2011

(51) Int. Cl.
*G05D 23/12* (2006.01)
*G05D 23/185* (2006.01)
*F16K 11/087* (2006.01)

(52) U.S. Cl.
USPC .............. 236/12.2; 236/12.11; 137/625.41

(58) Field of Classification Search ........... 236/12.11, 236/12.2; 137/468, 625.21, 625.41
See application file for complete search history.

(56) References Cited

U.S. PATENT DOCUMENTS 6,263,899 B1 * 7/2001 Zindler ........................ 137/98
2008/0093470 A1 * 4/2008 Qingjun ..................... 236/12.16

FOREIGN PATENT DOCUMENTS

| DE | 2904555 A | * | 8/1979 |
| JP | 2007292102 A | * | 11/2007 |
| TW | 347039 | * | 3/1998 |

* cited by examiner

*Primary Examiner* — Chen Wen Jiang
(74) *Attorney, Agent, or Firm* — Muncy, Geissler, Olds & Lowe, PLLC

(57) ABSTRACT

A thermostatic valve control structure mainly has an axial movement element movable axially to control opening size of a hot water inlet and a cold water inlet. The axial movement element has a ceramic layer which has a smooth surface to reduce friction with a sealing ring. The ceramic layer provides advantages of resisting acid and alkali, less likely to accumulate water dregs, simpler structure and longer life span. Thus the total life span and durability of the thermostatic valve control structure can be enhanced.

2 Claims, 6 Drawing Sheets

THERMOSTATIC VALVE CONTROL STRUCTURE

FIELD OF THE INVENTION

The present invention relates to a temperature control structure and particularly to a thermostatic valve control structure equipped with a ceramic layer.

BACKGROUND OF THE INVENTION

Applicant submitted a temperature sensor apparatus disclosed in R.O.C. patent pub. No. 347039 to provide constant temperature for a faucet as shown in FIG. 1. It includes a temperature sensor 1 to detect temperature, an axial bolting set 2 to assist the temperature sensor 1 to move axially and an annular compression spring 3 to provide a counterforce on the temperature sensor 1. By opening the faucet and setting water discharge temperature, a constant water temperature can be maintained through the temperature sensor 1.

The temperature sensor 1 is installed in a copper bushing 4 and generates friction with a rubber ring 5 held in the temperature sensor 1 during axial movement thereof. The copper bushing 4 also tends to accumulate water dregs to increase additional friction with the rubber ring 5. All this affects the life span of the rubber ring 5. Excessive friction also hinders the axial movement of the temperature sensor 1 and causes clogging. This impacts temperature adjustment function. Hence there are still rooms for improvement.

SUMMARY OF THE INVENTION

Therefore, the primary object of the present invention is to solve the problem occurred to the conventional temperature sensor installed in a copper bushing and results in accumulation of water dregs that increases friction with the rubber ring and affects life span of the rubber ring.

To achieve the foresaid object, the present invention provides a thermostatic valve control structure that comprises a rotary element, a water intake case coupling with the rotary element and an axial movement element located in the water intake case. The rotary element has an axis with a regulating portion located thereon that is axially extensible by turning. The water intake case has a hot water inlet, a cold water inlet and a sealing ring. The axial movement element has a temperature sensing bar run through and located therein and a ceramic layer covered on the surface thereof. The temperature sensing bar has one end butting the regulating portion and the other end coupling with an elastic element. The elastic element is held in the water intake case. The axial movement element is movable axially through the axial extension of the regulating portion. The ceramic layer has a smooth surface to reduce friction with the sealing ring. Through the axial movement of the axial movement element, the opening size of the hot water inlet and cold water inlet can be controlled.

Thus the thermostatic valve control structure of the present invention has the ceramic layer located on the surface of the axial movement element with a smooth surface to reduce the friction with the sealing ring. It also provides many other benefits such as resisting acid and alkali, less likely to accumulate water dregs, having a simpler structure and longer life span. It also overcomes the problems of the conventional technique that is easily to accumulate water dregs and has greater friction on the rubber ring caused by water dreg accumulation on the copper bushing.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
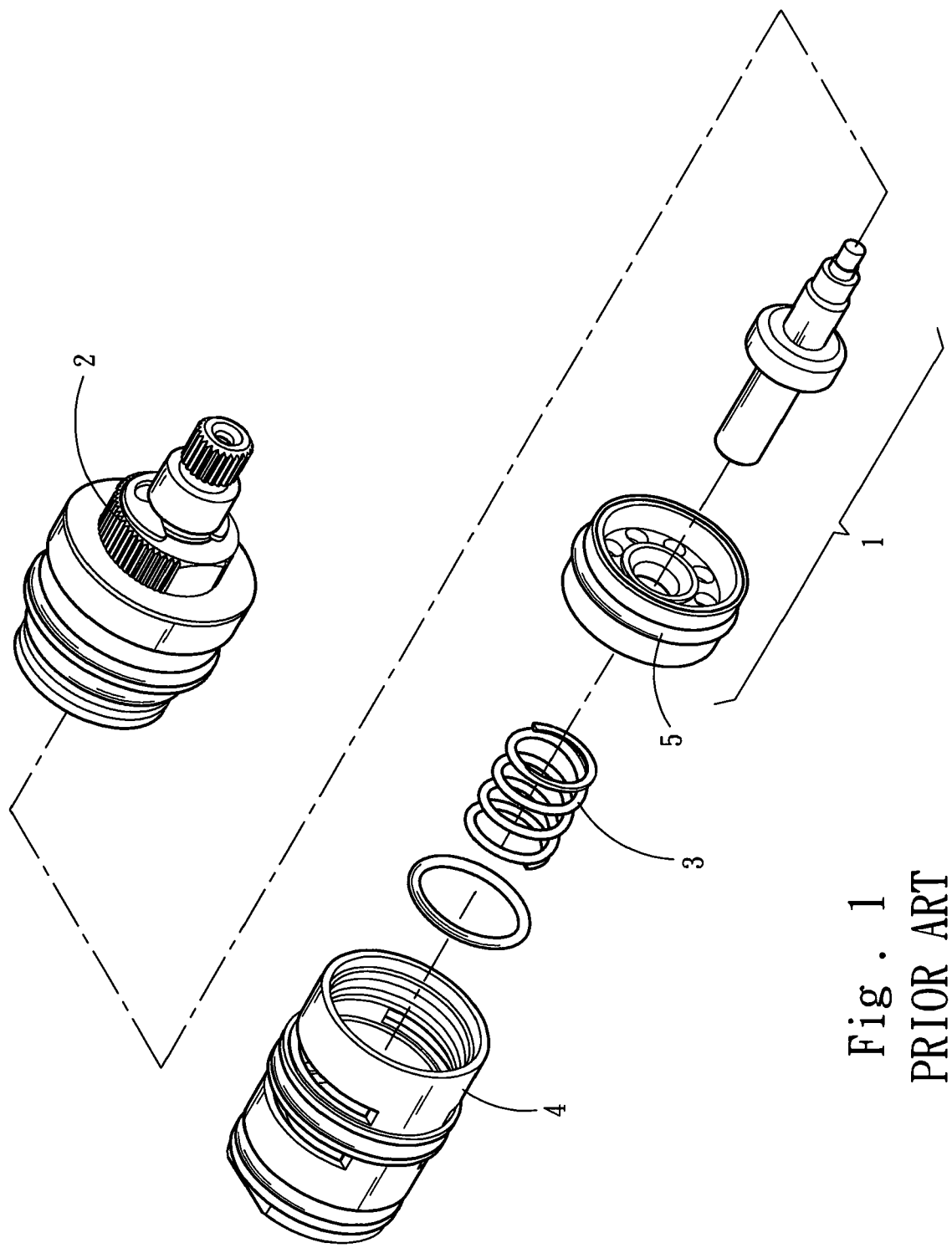
FIG. 1 is a schematic view of a conventional temperature sensor assembly.
Figure 2:
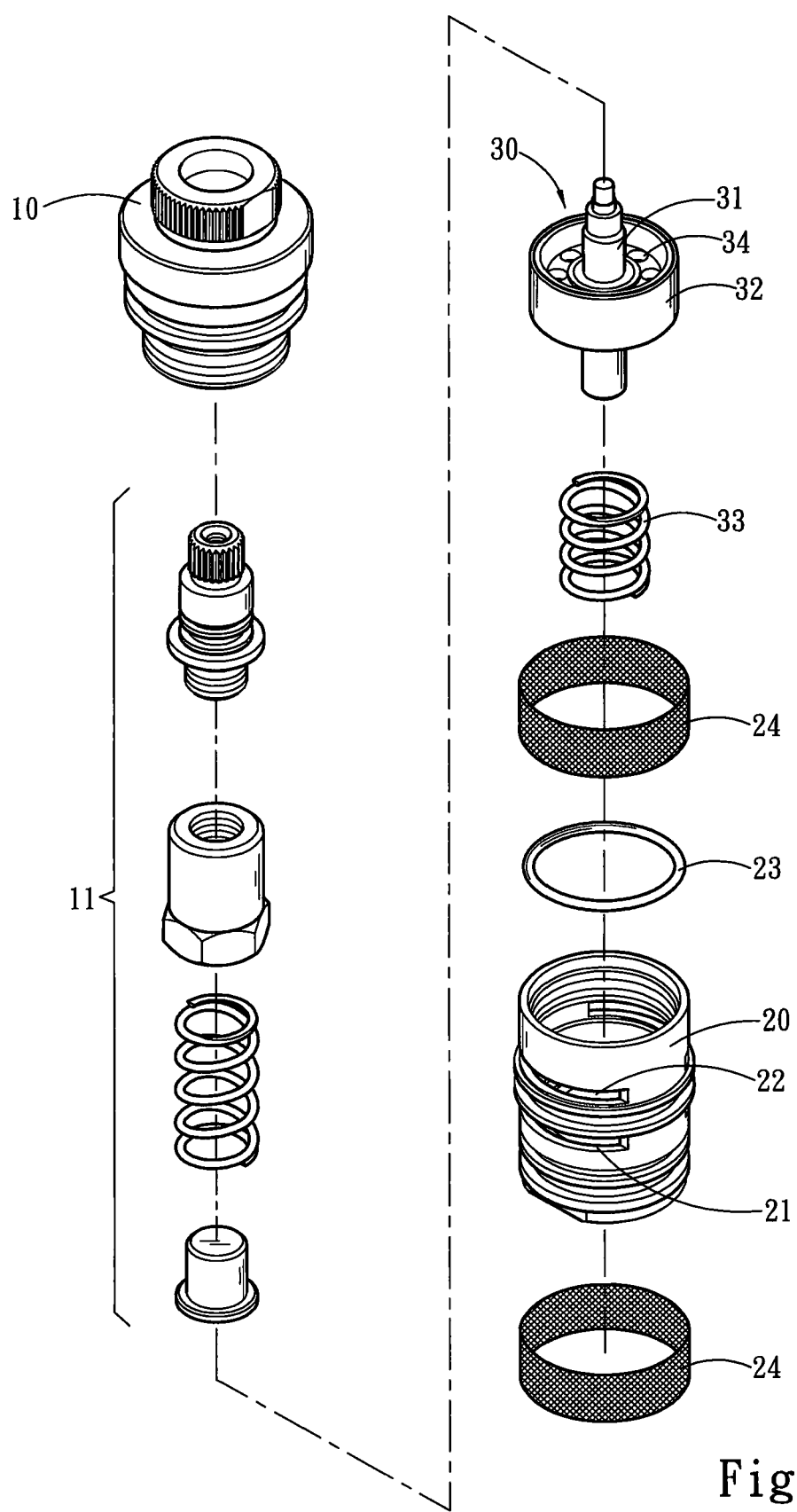
FIG. 2 is an exploded view of an embodiment of the present invention.
Figure 3:
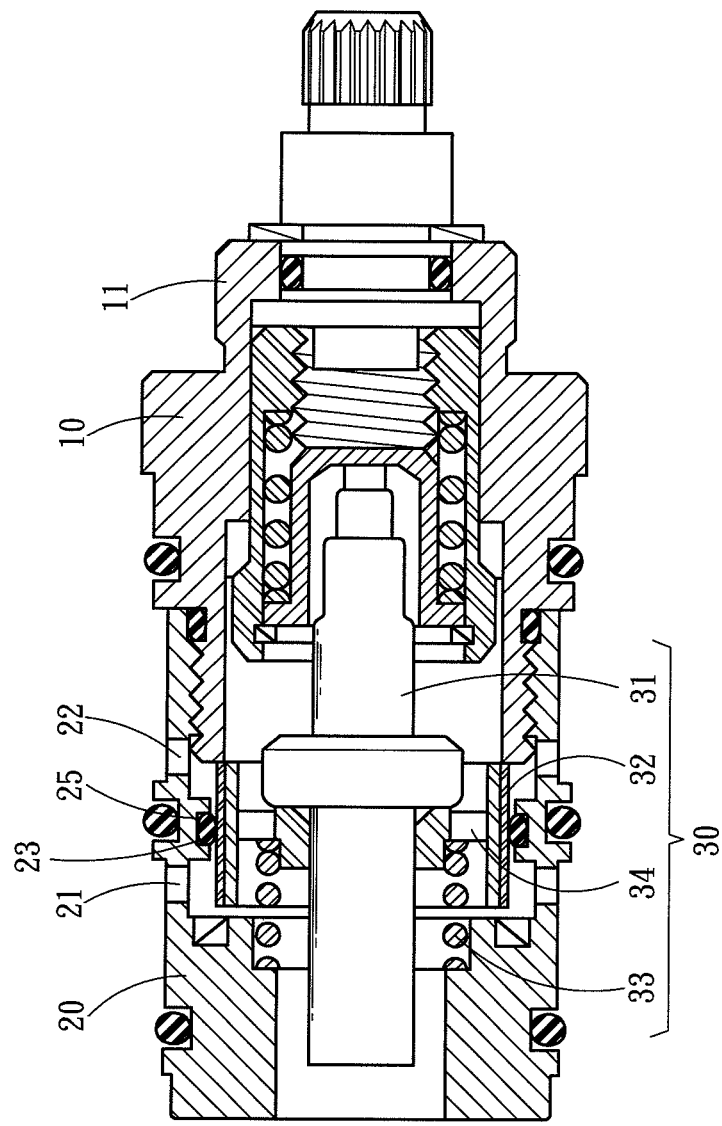
FIG. 3 is a schematic view of an embodiment of the present invention showing hot water discharge condition.

Please refer to FIGS. 2 and 3, the present invention provides a thermostatic valve control structure which comprises a rotary element 10, a water intake case 20 coupling with the rotary element 10 and an axial movement element 30 located in the water intake case 20. The rotary element 10 has an axis with a regulating portion 11 located therein that is axially extensible by turning. The water intake case 20 is coupled with the rotary element 10 by screwing, and has a hot water inlet 21, a cold water inlet 22, a positioning groove and a sealing ring 23 located in the positioning groove. The sealing ring 23 is interposed between the hot water inlet 21 and the cold water inlet 22. The axial movement element 30 has a temperature sensing bar 31 and a ceramic layer 32 covered on the surface thereof. The temperature sensing bar 31 has one end butting the regulating portion 11 and the other end coupling with an elastic element 33. The elastic element 33 is held in the water intake case 20. The axial movement element 30 is movable axially through the axial extension of the regulating portion 11 to control opening size of the hot water inlet 21 and cold water inlet 22. The sealing ring 23 is closely contacted with the ceramic layer 32 to prevent cold water or hot water from flowing through the gap formed between the ceramic layer 32 and the water intake case 20.

The ceramic layer 32 has a smooth surface to reduce friction with the sealing ring 23. The ceramic layer 32 is made of a resin consisting of nano-size silicon dioxide by a sol-gel process. Thus it has characteristics of resisting abrasion, smaller friction, resisting acid and alkali, less likely to accumulate water dregs and longer life span.

Moreover, the water intake case 20 has two filters 24 located respectively on the hot water inlet 21 and the cold water inlet 22 to filter out impurities contained in the hot water and cold water entering the water intake case 20. It is to be noted that in the description discussed below incorporating with the drawings, the filters 24 are not included. But in an embodiment the filters 24 are included in the water intake case 20 to filter out the impurities in the water.

Refer to FIG. 3 for an embodiment of the present invention. The hot water inlet 21 and the cold water inlet 22 are spaced from each other at a distance to mate the width of the ceramic layer 32 so that the axial movement element 30 with the ceramic layer 32 can control the opening size of the hot water inlet 21 and cold water inlet 22 through the axial movement. The axial movement element 30 has a plurality of apertures 34 to allow water to flow through. By turning the regulating portion 11 of the rotary element 10 to move axially towards the cold water inlet 22, the opening of the cold water inlet 22 can be shrunk.

Figure 4:
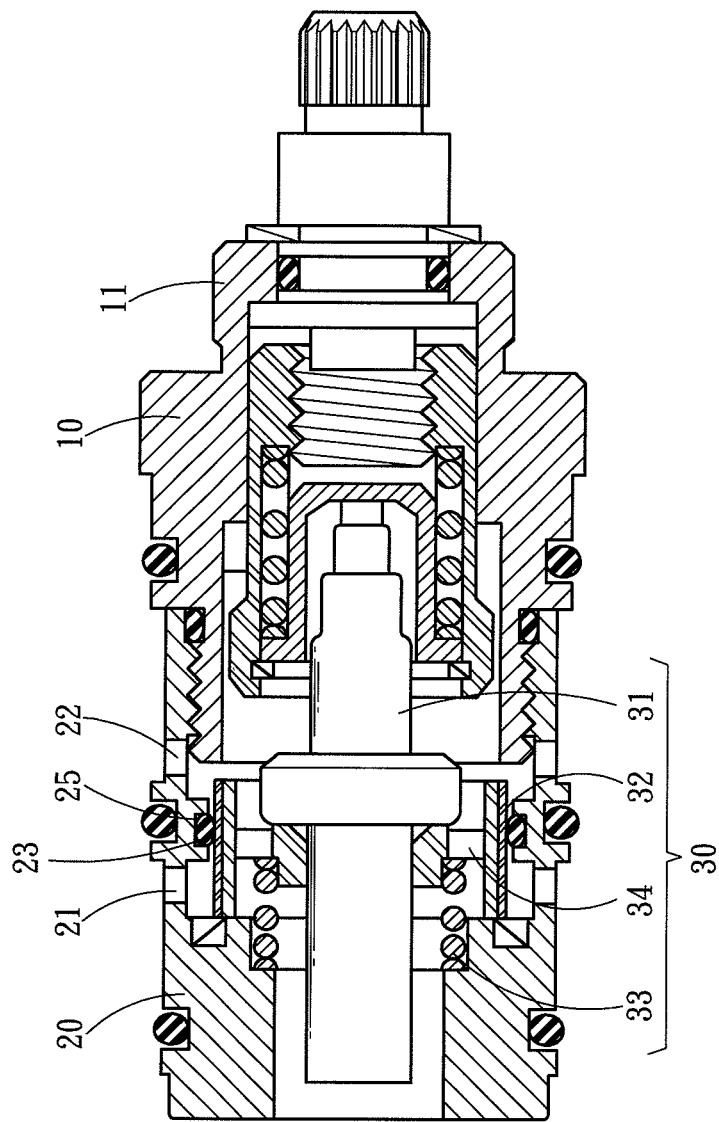
FIG. 4 is a schematic view of an embodiment of the present invention showing cold water discharge condition.

Referring to FIG. 4, the axial movement element 30 also can be moved axially towards the hot water inlet 21 through the axial extension of the regulating portion 11 to shrink or even close the opening of the hot water inlet 21, thereby to adjust or stop hot water intake amount.

Figure 5:
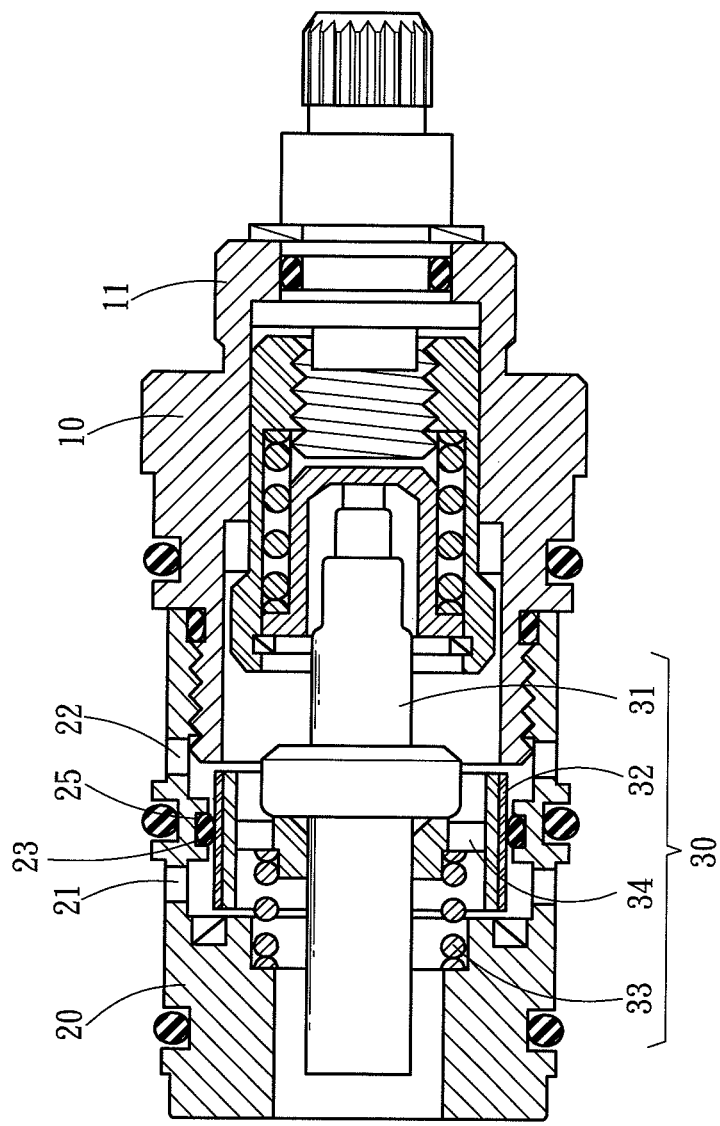
FIG. 5 is a schematic view of an embodiment of the present invention showing mixed water discharge condition.

Referring to FIG. 5, the axial movement element 30 may also be adjusted and positioned between the hot water inlet 21 and the cold water inlet 22 so that water can enter through the hot water inlet 21 and cold water inlet 22 at the same time. The cold water enters to one end of the hot water inlet 21 through the apertures 34 of the axial movement element 30 and to mix with the hot water to become mixed water to be discharged.

Figure 6:
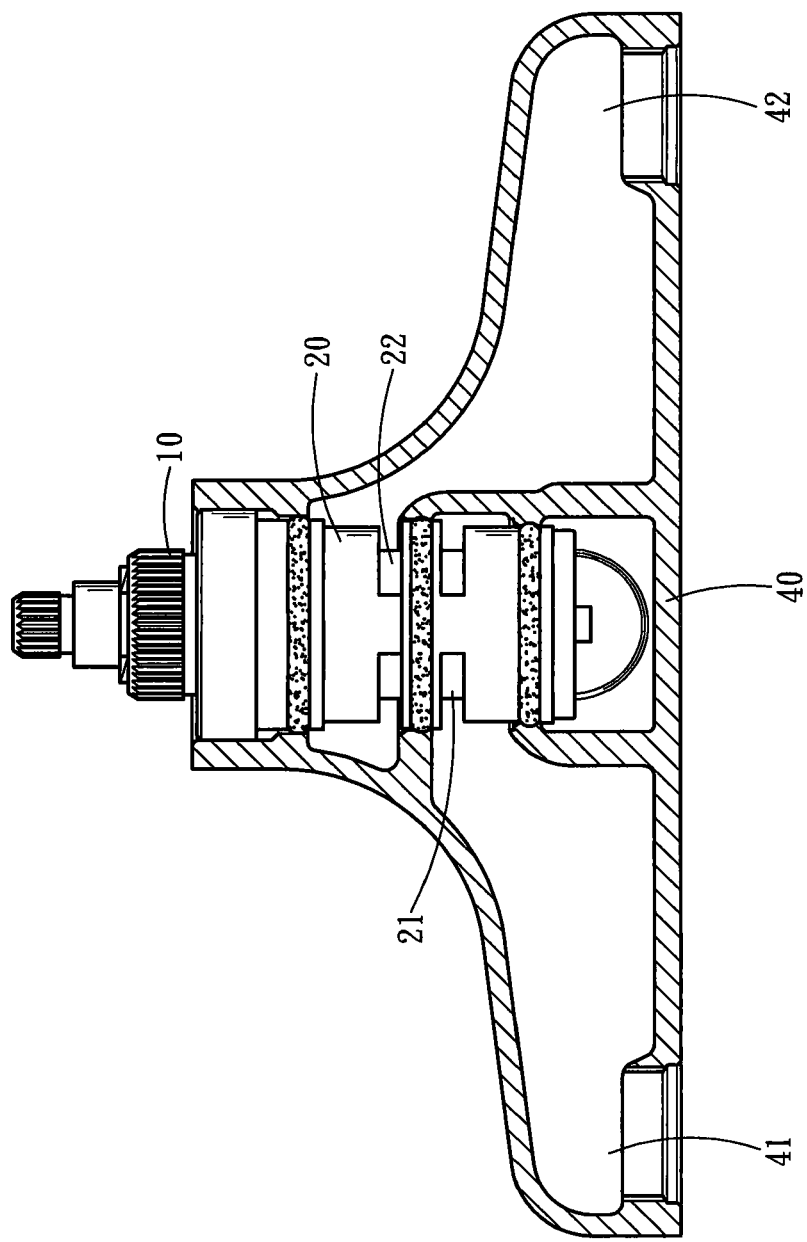
FIG. 6 is a schematic view of an embodiment of the present invention equipped with a water supply faucet.

Referring to FIG. 6, the thermostatic valve control structure of the present invention may further include a water supply faucet 40 to supply hot water and cold water. The water supply faucet 40 has a hot water supply port 41 and a cold water supply port 42 that are connected respectively to the hot water inlet 21 and cold water inlet 22 of the water intake case 20.

It is to be noted that the mixed water previously discussed not only is formed by mixing the hot water and cold water. The thermostatic valve control structure of the present invention can also provide intake of pure cold water. Hence the mixed water is not limited by mixing the hot water and cold water.

As a conclusion, the thermostatic valve control structure of the present invention provides the ceramic layer 32 located on the surface of the axial movement element 30 that has a smooth surface to reduce the friction with the sealing ring 23 in the water intake case 20. The ceramic layer 32 also can resist acid and alkali, less likely to accumulate water dregs, has a simpler structure and can provide a longer life span. It effectively overcomes the problems of the conventional technique that uses the copper bushing which is easily eroded by acid and alkali, clogged by water dregs and results in greater friction with the rubber ring.

What is claimed is:

1. A thermostatic valve control structure, comprising:
   a rotary element including a regulating portion extensible axially by turning;
   a water intake case coupling with the rotary element and including a hot water inlet, a cold water inlet, a positioning groove and a sealing ring located in the positioning groove; and
   an axial movement element which is located in the water intake case and includes a ceramic layer covering on the surface thereof and a plurality of apertures to allow water to flow through, the axial movement element being coupled with the regulating portion and movable axially through the axial extension of the regulating portion; the ceramic layer being tightly coupled with the sealing ring of the water intake case and having a smooth surface to reduce friction with the sealing ring;
   wherein opening size of the hot water inlet and the cold water inlet is controllable by the axial movement of the axial movement element.

2. The thermostatic valve control structure of claim 1, wherein the ceramic layer is made of a resin consisting of nano-size silicon dioxide.

* * * * *